ELECTRICAL LOGIC CONTROL ELEMENT

Filed Nov. 6, 1961

INVENTOR.

John N. Barr

BY Harold J. Rathbun

Atty.

United States Patent Office
3,202,835
Patented Aug. 24, 1965

3,202,835
ELECTRICAL LOGIC CONTROL ELEMENT
John N. Barr, Detroit, Mich., assignor to Square D Company, Park Ridge, Ill., a corporation of Michigan
Filed Nov. 6, 1961, Ser. No. 150,224
6 Claims. (Cl. 307—88.5)

This invention relates to an electrical control or logic element usable in logic circuitry, and more particularly to a static electrical logic element having a tunnel diode as the basic control device and capable of providing NOT, AND, and non-retentive MEMORY functions.

A common requirement in industrial control circuitry is for a signal-producing means or logic element that will provide a continuing output signal at a power level in the neighborhood of 100 watts or more as a result only of concurrent activation of all of the inputs of one group of inputs while an input of another group of inputs is not activated. Because the inputs should lose control after the output is established, there must be provision for discontinuing the output as by activation of a reset means. A logic element in accordance with this invention has these capabilities and has the further advantages of operating directly from a 120 volt, 60 cycle supply source and of being able to provide an alternating current output of one ampere or more at about 120 volts without an auxiliary power supply. In logic terminology, the element constitutes a multi-input AND combined with a NOT and a non-retentive MEMORY.

An object of this invention is to provide an improved electrical control element usable in logic circuitry.

Another object is to provide an improved static logic element providing NOT, AND, and non-retentive MEMORY functions.

Another object is to provide an improved static logic element in which a control device having a non-linear current-voltage characteristic is controlled by changing the magnitude of the current flowing therethrough to provide output voltages at different levels.

Another object is to provide a static logic element comprising an electroresponsive control device operative to provide output voltages entirely within a first relatively low range while current flowing therethrough is initially below an upper limiting value, to provide output voltages entirely within a second range materially above the first range upon the current exceeding the upper limiting value, to continue to provide output voltages entirely within the second range after the current is reduced materially below the upper limiting value, and to provide output voltages entirely within the first range upon reduction of the current, after it has exceeded the upper limiting value, to a valve below a low limiting value, means to control the magnitude of the current so as to shift the output voltages from range to range, selectively, and a means responsive to the various output voltages to perform control functions.

Another object is to provide an improved electrical control element in which the current through a tunnel diode is controlled thereby to cause a sudden change in voltage across the diode.

Other objects and advantages of this invention will be apparent from the following description wherein reference is made to the accompanying drawing, in which.

Figures 1, 2:
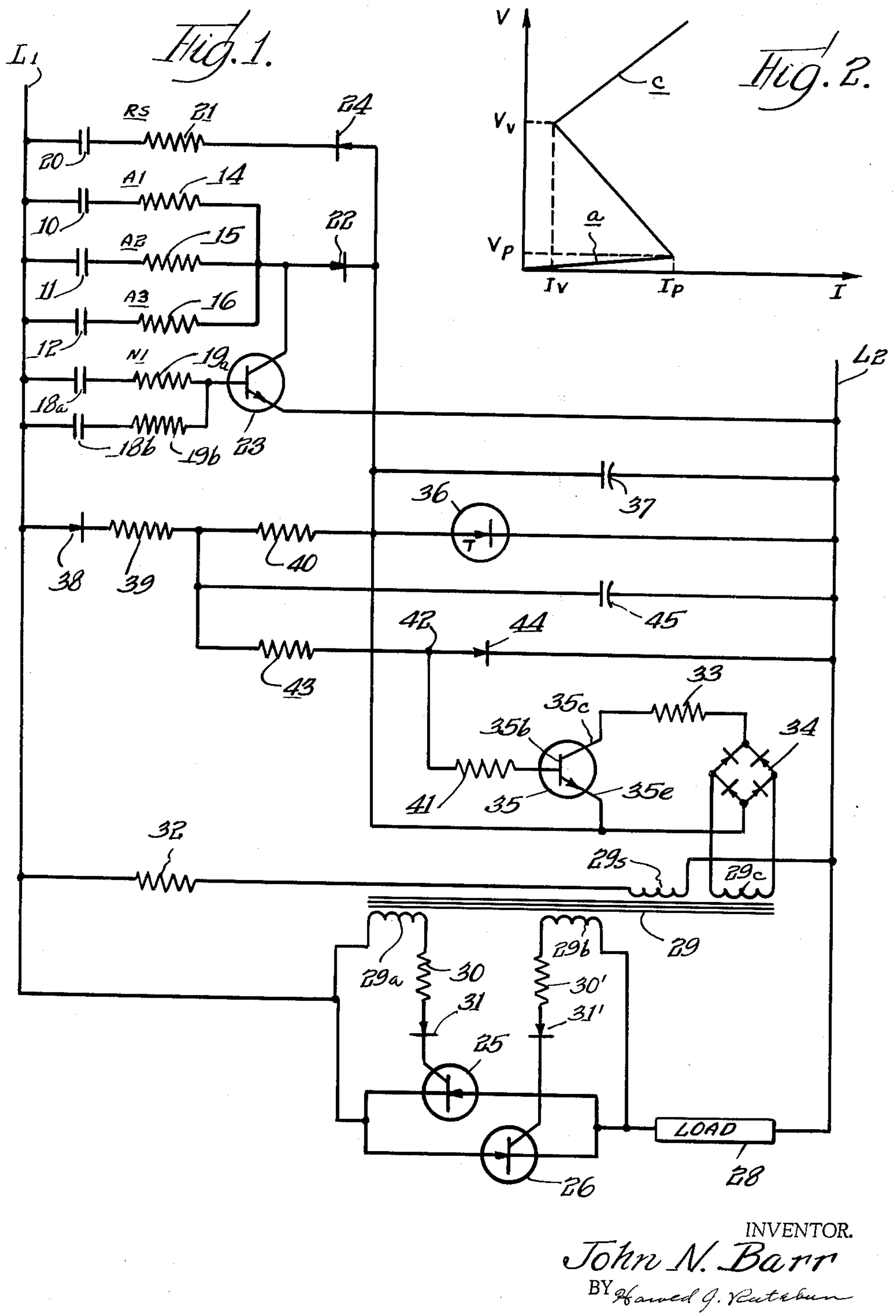
FIGURE 1 is a wiring diagram illustrating an embodiment of the invention.
FIGURE 2 is a graph showing the current-voltage characteristics of an electroresponsive control device used in the embodiment of FIG. 1.

As shown in the wiring diagram of FIG. 1, a logic control element in accordance with this invention has three AND inputs A1, A2, and A3, a NOT input N1, and a reset input RS all arranged to be connected to a supply conductor L1 of a source of alternating current, the other supply conductor being L2. One of the advantages of the logic element is that the conductors L1 and L2 may supply power to the element at the conventional values of 120 volts and 60 cycles.

The AND inputs A1, A2, and A3 are shown as normally open contacts 10, 11, and 12 connected in series with isolating and current limiting resistors 14, 15, and 16, respectively; the NOT input N1 is shown as parallel connected normally open contacts 18*a* and 18*b* connected in series with isolating and current limiting resistors 19*a* and 19*b*, respectively; and the RESET input RS is shown as a normally open contact 20 connected in series with an isolating and current-limiting resistor 21. It will be understood that the contacts 10, 11, 12, 18*a*, 18*b*, and 20 can be considered as part of the logic element or alternatively can be contacts of extraneous control devices such as limit switches, interlock switches, and the like.

The AND inputs A1, A2, and A3 are connected in parallel with each other, and a diode 22 in series with the paralleled AND inputs insures that only positive half-waves of current flow from the conductor L1 through the AND inputs and the diode 22. Similarly, a diode 24 in series with the RESET input RS insures that only negative half-waves of current flow from the conductor L1 through the RESET input. The contacts 18*a* and 18*b* and the resistors 19*a* and 19*b* of the NOT input N1 are interposed between the conductor L1 and a base of a transistor 23 having its emitter connected to the conductor L2 and its collector connected to the common terminal of the AND inputs A1, A2, and A3 and the diode 22.

The output circuit of the logic element preferably comprises a pair of controllable semi-conductor rectifiers 25 and 26 connected in inverse parallel between the conductor L1 and one terminal of a load 28 having its other terminal connected to the conductor L2. It will be understood that the other devices capable of having their conduction controlled by a voltage signal can be used in place of the controllable rectifiers 25 and 26.

Conduction of the controllable rectifiers 25 and 26 may be controlled by voltage pulses impressed on their control elements from respective secondary windings 29*a* and 29*b* of a saturable or peaking transformer 29 having a saturating winding 29*s* and a control winding 29*c*. A current limiting resistor 30 and a diode 31 are connected in series with each other between the secondary winding 29*a* and the control element of the controllable rectifier 25 and similarly a resistor 30′ and a diode 31′ are connected in series with each other between the secondary winding 29*b* and the control element of the controllable rectifier 26.

The saturating winding 29*s* is connected across the conductors L1 and L2 in series with a current-limiting resistor 32 and the control winding 29*c* is connected through a resistor 33 and a full-wave rectifier 34 across a collector 35*c* and an emitter 35*e* of a transistor 35 having a base 35*b*. When the emitter-collector circuit of the transistor 35 is conductive, a current flows in the winding 29*c* during each pulse of flux in the core of the transformer 29 thereby to prevent voltage pulses of operating magnitude from occurring in the secondary windings 29*a* and 29*b*. This, in turn, prevents conduction of the controllable rectifiers 25 and 26. When the emitter-collector circuit of the transistor 35 is non-conductive, no current flows in the winding 29*c* and voltage pulses of operating magnitude occur in the secondary windings 29*a* and 29*b* to cause conduction of the controllable rectifiers 25 and 26.

As will be explained, conduction of the transistor 35 depends upon the voltage across a control device having a non-linear current-voltage characteristic such as a tunnel diode 36. So long as the voltage across the tunnel diode 36 is above a predetermined value, the transistor 35 is non-conductive thereby to permit operative voltage pulses to be impressed through the windings 29*a* and 29*b* on the control elements of the controllable recitifiers 25 and 26 thereby permitting alternating current to flow through the load 28. Whenever the voltage across the tunnel diode 36 is below the predetermined value, the transistor 35 conducts, operative voltage pulses are not impressed on the control elements of the controllable rectifiers 25 and 26, and the load current is zero.

The tunnel diode 36 has an S-shaped voltage-current characteristic in its forward direction as shown in FIG. 2. For one tunnel diode that has been found suitable, an initial current peak I*p* is about five milli-amperes at a peak voltage V*p* of about 0.05 volt, a valley current I*v* is about one milli-ampere at a valley voltage V*v* of about 0.5 volt, and thereafter the current increases continuously with voltage. Thus, the voltage across the tunnel diode 36 cannot exceed a predetermined peak voltage V*p* until the current flowing through the tunnel diode exceeds the peak current I*p*.

The positive terminal of the tunnel diode 36 is connected to the common terminal of the diodes 22 and 24 and the negative terminal of the tunnel diode 36 is connected to the conductor L2. Preferably, a by-pass capacitor 37 is connected in parallel with the tunnel diode 36. The circuit parameters are so selected that a current in excess of the peak current I*p* can flow in the tunnel diode 36 only if the contacts 10, 11 and 12 of the AND inputs A1, A2, and A3 are all closed, and neither of the contacts 18*a* and 18*b* of the NOT input N1 is closed.

Closure of any one of the contacts 10, 11, or 12, or any two of them, does not cause the current flowing through the tunnel diode 36 to exceed the peak current I*p*. Operation of the tunnel diode 36 is then along a portion *a* of its characteristic. If either the contact 18*a* or the contact 18*b*, or both, of the NOT input N1 are closed while the voltage across the tunnel diode 36 is less than the peak voltage V*p*, the emitter-collector circuit of the transistor 23 becomes conductive to provide a bypass circuit around the tunnel diode 36 thereby to prevent the current through the tunnel diode 36 from exceeding the peak value I*p*. This prevents the voltage across the tunnel diode 36 from exceeding the peak voltage V*p*, and operation thus remains along the portion *a* of the characteristic.

However, if all three of the contacts 10, 11 and 12 of the AND inputs are closed and neither of the contacts 18*a* and 18*b* of the NOT input N1 is closed, the peak current I*p* is exceeded, and the operation of the tunnel diode 36 immediately shifts from operation along the portion *a* to operation along the portion *c* of its characteristic. Should one or more of the contacts 10, 11, and 12 of the AND inputs be opened after operation of the tunnel diode 36 has been shifted to the portion *c* of its characteristic, the voltage across the tunnel diode 36 decreases along the portion *c* toward the valley voltage V*v* but does not decrease below the voltage V*v* because a bias current slightly in excess of the valley current I*v* flows through the tunnel diode 36 from the conductr oL1 through a circuit including a diode 38, a resistor 39, and a resistor 40.

Should either one of the contacts 18*a* and 18*b* be closed after the voltage across the tunnel diode 36 reaches a value greater than the valley voltage V*v*, that is, while operation is along the portion *c* of the characteristic, the transistor 23 conducts as before, but because of the bias current flowing in the tunnel diode 36, the voltage across the tunnel diode 36 does not fall below the valley value V*v* and operation remains along the curve portion *c*. Thus, after operation of the tunnel diode 36 has been transferred to the portion *c* of its characteristic, the AND inputs A1, A2, and A3 and the NOT input N1 lose control and a non-retentive MEMORY condition is established.

The transistor 35, which responds to the voltage across the tunnel diode 36 to control the controllable rectifiers 25 and 26, has its emitter 35*e* connected to the positive terminal of the tunnel diode 36 and its base 35*d* connected through a resistor 41 to a point 42 of fixed voltage on a voltage divider constituting the diode 38, the resistor 39, a resistor 43 and a diode 44 all connected in series across the conductors L1 and L2, and a filtering capacitor 45 connected in parallel with the series-connected resistor 43 and diode 44. Thus, the voltage at the base 35*b* of the transistor 35 remains fixed, while the voltage at the emitter 35*e* of the transistor 35 is variable because it is connected to the positive terminal of the tunnel diode 36. The capacitor 45 also cooperates with the bias circuit including the rectifier 38 and the resistors 39 and 40 to insure that the minimum bias current through the tunnel diode 36 does not fall below the valley current I*v*.

The parameters are selected so that the fixed voltage at the base 35*b* of the transistor 35 is between the peak voltage V*p* and the valley voltage V*v* which appear at the positive terminal of the tunnel diode 36. Thus, until the voltage at the positive terminal of the tunnel diode 36 reaches or exceeds the valley voltage V*v*, the base 35*b* of the transistor 35 is more positive than the emitter 35*e*, and collector to emitter current flows through the transistor 35 effectively preventing the firing action of the transformer 29.

When the contacts 10, 11 and 12 of the AND inputs A1, A2, and A3 are all closed, and neither of the contacts 18*a* and 18*b* of the NOT input N1 is closed, the voltage at the positive terminal of the tunnel diode 36 increases above the valley voltage V*v* and the emitter 35*e* of the transistor 35 becomes more positive than the base 35*b* causing the transistor 35 to become non-conductive. Voltage pulses now appear at the windings 29*a* and 29*b* and the controllable rectifiers 25 and 26 are rendered conductive to supply the load 28. Because of the previously described bias current flowing in the tunnel diode 36, subsequent operation of any of the contacts 10, 11, 12, 18*a*, and 18*b* does not cause the current in the tunnel diode 36 to decrease below the valley current I*v*, and the AND and NOT inputs have thereby lost control.

To reset the system to its initial condition, the contact 20 of the reset input RS is closed. This causes a negative voltage to be impressed momentarily at the positive terminal of the tunnel diode 36 causing the current in the tunnel diode 36 to decrease below the valley current I*v* and shifting operation from the curve portion *c* to the curve portion *a*. The voltage at the positive terminal of the tunnel diode 36 then drops from a value above the valley voltage V*v* to a value below the peak voltage V*p*. The transistor 35 immediately starts to conduct to absorb the transformer pulses, thus rendering the controllable rectifiers 25 and 26 non-conductive. The voltage across the tunnel diode 36 remains at this low value until the contacts 10, 11, and 12 of the AND inputs A1, A2, and A3 are again all connected to L1 with both of the contacts 18*a* and 18*b* of the NOT input N1 open.

There has thus been provided a logic control element having AND, NOT, and non-retentive MEMORY functions and capable of producing an output of considerable power without an auxiliary power supply.

Having thus described my invention, I claim:

1. An electrical logic control element comprising a voltage-controlled negative-resistance device capable of selectively assuming lower and higher stable voltage levels, impedance means, means connecting said device and said impedance means in series with each other and for connecting the series combination thus formed across a source of power, semiconductor switching means capable of assuming conductive and non-conductive states of operation, selectively, and connected in parallel with said device and in series with said impedance means so as to be responsive to the voltage level of said device, said switching means being in one of said states of operation when said device is at said lower voltage level and being in the other of said states of operation when said device is at said higher voltage level, output control means for controlling the flow of current from said source to a load, said output control means being coupled to said switching means and being operative to permit current flow to the load when said switching means is in said other of said states of operation and operative to prevent current flow to the load when said switching means is in said one of said states of operation, and input control means for selectively establishing said lower and higher voltage levels of said device, said input control means including a plurality of AND input means and at least one NOT input means connected to said device and operative to cause said higher voltage level to be assumed by said device only when each of said plurality of said AND input means is operated in the absence of operation of said NOT input means.

2. An electrical logic element in accordance with claim 1 characterized in that said switching means is conductive when said device is at said lower voltage level and non-conductive when said device is at said higher voltage level.

3. An electrical logic control element for operation from an alternating current source and comprising a voltage-controlled negative-resistance device capable of selectively assuming lower and higher stable voltage levels, a rectifier, impedance means, means connecting said device and said impedance means in series with each other to form a series combination, means for connecting said series combination across a source of alternating current through said rectifier, semiconductor switching means connected in parallel with said device and in series with said impedance means so as to be responsive to the voltage level of said device, said switching means being conductive when said device is at said lower voltage level and being non-conductive when said device is at said higher voltage level, output control means for controlling the flow of current from said source to a load, said output control being coupled to said switching means and being operative to permit current flow to the load when said semiconductor switching means is non-conductive and operative to prevent current flow to the load when said switching means is conductive, and input control means for selectively establishing said lower and higher voltage levels of said device, said input control means including a plurality of AND input means and at least one NOT input means connected to said device and operative to cause said higher voltage level to be assumed by said negative-resistance device only when each of said AND input means is operated in the absence of operation of said NOT input means.

4. An electrical logical control element in accordance with claim 3 characterized in that a reset input means is operable to shunt said impedance means to reverse the polarity at said device thereby to cause said device to assume said lower voltage level.

5. An electrical logic control element comprising a voltage-controlled negative-resistance device capable of selectively assuming lower and higher stable voltage levels, impedance means, means connecting said device and said impedance means in series with each other and for connecting the series combination thus formed across a source of power, semiconductor switching means connected in parallel with said device and in series with said impedance means so as to be responsive to the voltage level of said device, said switching means being conductive when said device is at said lower voltage level and being non-conductive when said device is at said higher voltage level, output control means for controlling the flow of current from said source to a load, said output control means being coupled to said switching means and operative to permit current flow to the load when said switching means is non-conductive and operative to prevent current flow to the load when said switching means is conductive, and input control means for selectively establishing said lower and higher voltage levels of said device, said input control means including reset means, a plurality of AND input means each operable to shunt said impedance means and at least one NOT input means operable to shunt said device, shunting of said impedance means by operation of all of said AND input means causing said higher voltage level to be assumed by said device in the absence of operation of said NOT input means, operation of said NOT input means shunting said device to prevent assumption thereby of said higher voltage level, and operation of said reset means returning said device from said higher voltage level to said lower voltage level.

6. An electrical logic control element for operation from an alternating current source comprising a voltage-controlled negative-resistance device capable of selectively assuming lower and higher stable voltage levels, first rectifier means, impedance means, means connecting said device, said first rectifier means and said impedance means in series with each other and for connecting the series combination thus formed across a source of alternating current, semiconductor switching means capable of assuming conductive and non-conductive states of operation, selectively and connected in parallel with said device and in series with said impedance means so as to be responsive to the voltage level of said device, said switching means being in one of said states of operation when said device is at said lower voltage level and being in the other of said states of operation when said device is at said higher voltage level, output control means for controlling the flow of current from said source to a load, said output control means being coupled to said switching means and being operative to permit current flow to the load when said switching means is in said other of said states of operation and operative to prevent current flow to the load when said switching means is in said one of said states of operation, and input control means for selectively establishing said lower and higher voltage levels of said device, said input control means including a plurality of AND input means, at least one NOT input means, a reset means and a second and third rectifier means, said AND input means being operable to shunt said first recitifier means and said impedance means through said second rectifier means to cause increased current to flow through said device, said device assuming said higher voltage level upon operation of all of said AND input means, said NOT input means being operable to shunt said device to prevent said device from assuming said higher voltage level, and said reset means being operable to shunt said first rectifier means and said impedance means through said third rectifier means to reverse the voltage at said device thereby causing said device to assume said lower voltage level.

References Cited by the Examiner

UNITED STATES PATENTS 3,075,088 1/63 Li ________________ 307—88.5

OTHER REFERENCES

Control Engineering (Magazine), May 1957 (page 82 relied on).

General Electric Controlled Rectifier Manual, 1960, 1st edition (pages 87, 91, 99 relied on).

General Electric Tunnel Diode Manual, March 20, 1961 (pages 55 and 56 relied on).

ARTHUR GAUSS, *Primary Examiner.*